United States Patent [19]

Carson

[11] Patent Number: 4,796,478
[45] Date of Patent: Jan. 10, 1989

[54] NON-LINEAR ROTARY DRIVE APPARATUS

[76] Inventor: Donald G. Carson, 12108 Towner Ave., NE., Albuquerque, N. Mex. 87112

[21] Appl. No.: 11,684

[22] Filed: Feb. 6, 1987

[51] Int. Cl.⁴ .................. F16H 27/02; F16H 29/02
[52] U.S. Cl. .............................. 74/89.2; 74/393; 74/517
[58] Field of Search .............. 74/89.2, 89.21, 89.22, 74/10.7, 501.5, 496, 506, 517, 393, 394, 437

[56] References Cited

U.S. PATENT DOCUMENTS

| | | | |
|---|---|---|---|
| 1,245,804 | 11/1917 | Schaar | 74/437 |
| 1,916,871 | 7/1933 | Swift | 74/394 |
| 2,143,236 | 1/1939 | Birk | 74/437 |
| 3,204,472 | 9/1965 | Grogens et al. | 74/89.2 |
| 3,213,696 | 10/1965 | Manley | 74/393 |
| 4,351,197 | 9/1982 | Carson | 74/89.22 |
| 4,507,979 | 4/1985 | Zebrowski | 74/96 |

Primary Examiner—Lawrence Staab
Attorney, Agent, or Firm—H. Gordon Shields

[57] ABSTRACT

Rotary drive apparatus includes a rotatable member secured to a pivoting arm and another rotatable member having an axis of rotation offset from the geometric center of the member to produce a non-linear rotation. Two embodiments are shown, one in which the driving member is pivoted and a second in which the driven member is pivoted.

8 Claims, 2 Drawing Sheets

U.S. Patent  Jan. 10, 1989  Sheet 1 of 2  4,796,478
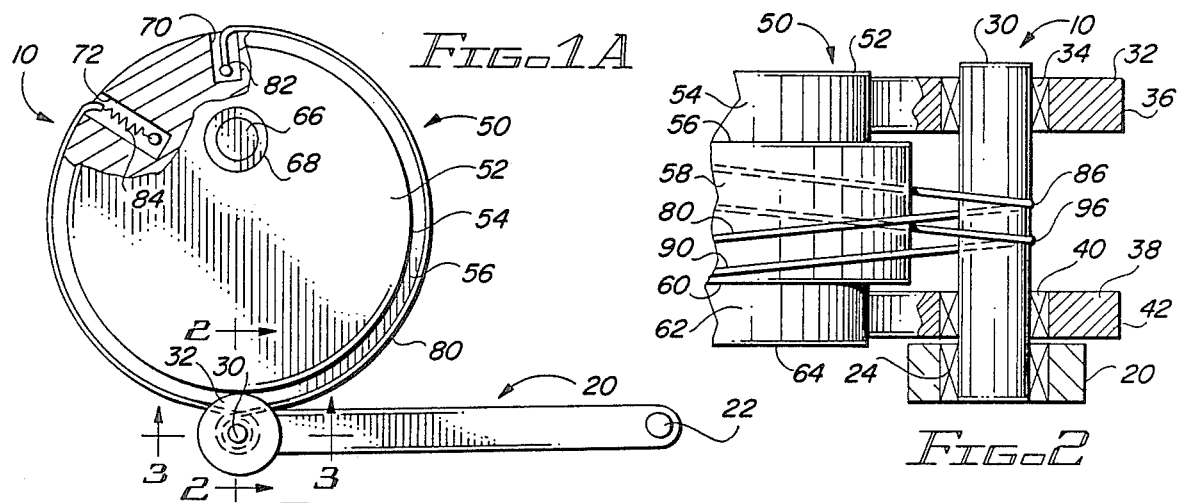
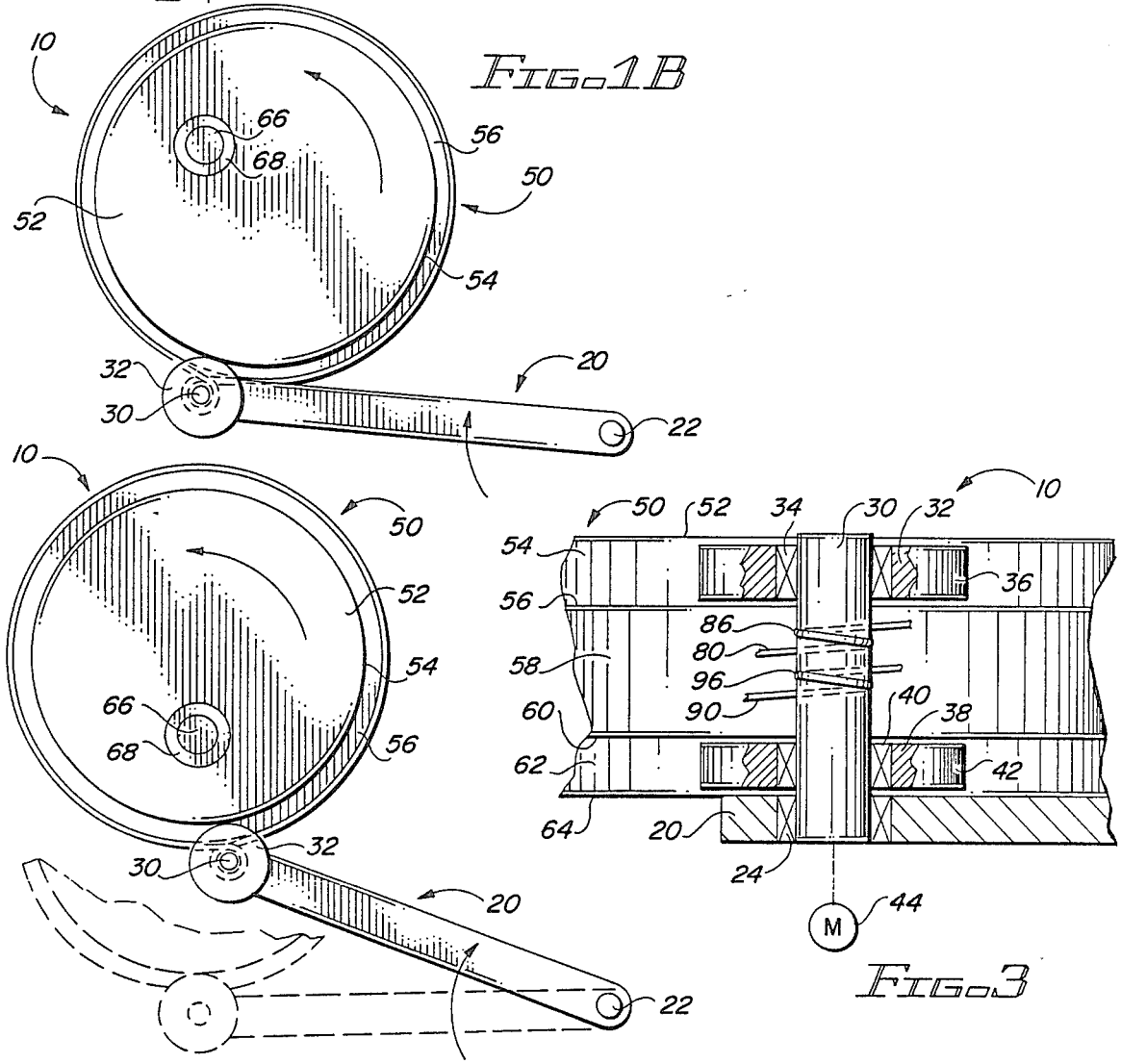

NON-LINEAR ROTARY DRIVE APPARATUS

BACKGROUND OF THE INVENTION

1. Field of the Invention

This invention relates to rotary drive apparatus in which a rotatable member is coupled by a cable to another rotatable member and, more particularly, to a rotary drive apparatus where one rotatable member is coupled by a cable to another rotatable member having an axis of rotation spaced apart from its geometric center.

2. Description of the Prior Art

U.S. Pat. No. 4,351,197 (Carson) discloses several embodiments of rotary drive systems in which a screw is coupled to a drum by a cable connection and in which rotation of the screw results in rotation of the driven member. The driven member in each embodiment is a drum rotating about its geometric center. Since the driven member rotates about its geometric center, the rotation of the driven member is linear. That is, for a predetermined rotation of the driving member, a corresponding rotation of the driven member will result, and the ratio of the rotation is, of course, dependent upon the ratio of the cable pitch radii of the driving and driven members.

In some applications of a rotary drive system, it may be advantageous to have a non-linear rotational output of the driven member. That is, for a predetermined rotation of the driving member, the rate of rotation and the angle rotated of the driven member may be variable, depending on the distance from the geometric center of the driven member to its axis of rotation. In such an eccentric rotational system, either the driven member or the driving member must be pivoted to allow the driven member to rotate asymmetrically. Accordingly, either the driving member or the driven member may be fixed and the other may be pivotally secured.

SUMMARY OF THE INVENTION

The invention described and claimed herein comprises a rotary drive system in which a driving member is coupled through a cable to a driven member, and the driven member rotates about an axis offset from its geometric center to provide a non-linear movement of the driven member. Either the driving member or the driven member may be pivoted to provide compensation for the nonlinear movement.

Among the objects of the present invention are the following:

To provide new and useful rotary drive apparatus;

To provide new and useful rotary drive apparatus having a non-linear rotation of the driven member;

To provide new and useful rotary drive apparatus in which a driving member is coupled by a cable to a driven member having an axis of rotation spaced apart from its geometric center;

To provide new and useful rotary drive apparatus having a cable coupling a driving member to a driven member and the driven member rotates asymmetrically with respect to the driving member;

To provide new and useful rotary drive apparatus having a non-linear rotational output of the driven member and the driven member pivots relative to the driving member; and To provide new and useful rotary drive apparatus in which a driving member is pivotally connected to a driven member through a cable connection and in which the driven member rotates asymmetrically to provide a non-linear rotary output.

BRIEF DESCRIPTION OF THE DRAWING

FIG. 1A is a top view of apparatus of the present invention.

FIG. 1B is a top view of the apparatus of the present invention sequentially illustrating the relative pivoting of the apparatus from the position shown in FIG. 1A.

FIG. 1C is a top view of the apparatus of the present invention sequentially illustrating the relative rotation of the apparatus from the position shown in FIG. 1B.

FIG. 2 is a view in partial section taken generally along line 2—2 of FIG. 1A.

FIG. 3 is a view in partial section of the apparatus of the present invention taken generally along line 3—3 of FIG. 1A.

DESCRIPTION OF THE PREFERRED EMBODIMENT

Figure 4:
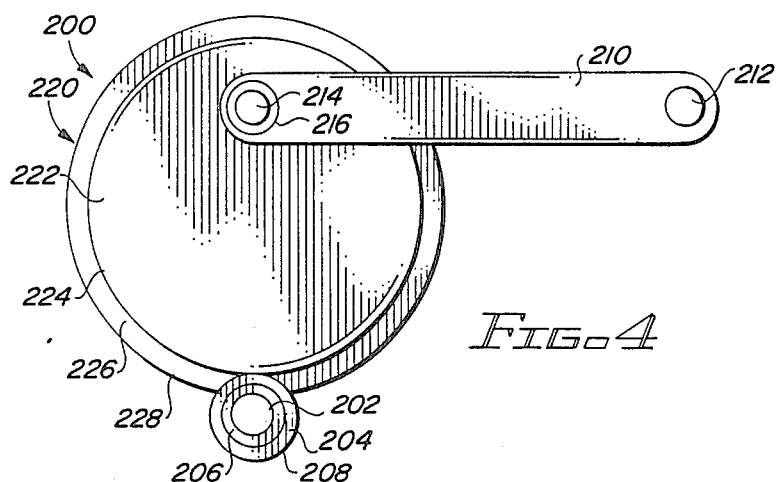
FIG. 4 is a top view of an alternate embodiment of the apparatus of the present invention.

FIG. 1A is a top view of non-linear rotary drive apparatus 10 embodying the present invention. The non-linear drive apparatus 10 includes a pivoting link 20 secured at one end to a fixed pivot pin 22 and secured at its opposite, movable end, to a rotatable member 30. The rotatable member 30 is in turn coupled by a pair of cables, including an upper cable 80, to a relatively large diameter rotatable member or drum 50. For purposes of illustrating the non-linear rotary drive apparatus 10, the movable element or member 30 will be generally referred to as the driving member, and the relatively large diameter drum 50 will be referred to as the driven element or member.

The drum 50 rotates about a pin or axle 66 which is off center from the geometric center of the drum 50. With an axle or pin 66 spaced apart from the geometric center of the drum 50, the drum moves in a non-linear manner in response to rotation or rotary movement of the drive element or member 30.

FIG. 1B illustrates the relative rotation of the drum 50 in response to rotation of the drive element or member 30. It will be noted, with reference to FIG. 1B, that the link 20 pivots on its pivot point 22 as the drum 50 rotates, maintaining the appropriate relationship between the drum 50 and the element 30. FIG. 1B illustrates sequentially the relative rotation of the drum 50 and the driving member 30, along with the pivoting of the link 20.

FIG. 1C illustrates the continued relative rotation of the drum 50 in response to rotation of the driving member 30, and also illustrates the continued pivoting of the link 20 in response to the rotation of the drum 50 and of the drive member 30. Thus, FIGS. 1B and 1C are consecutive or successive views illustrating the sequential relative movement of the rotary drive apparatus 10.

FIG. 2 is a view in partial section of the rotary drive apparatus 10 of the present invention taken generally along line 2—2 of FIG. 1, illustrating the coupling of the drive member or drive screw 30 to the drum 50 by the pair of cables, including the upper cable 80 and a lower cable 90.

FIG. 3 is another view in partial section of the rotary drive apparatus 10 of the present invention taken generally along line 3—3 of FIG. 1A. FIGS. 2 and 3 are taken generally ninety degrees from each other, as shown in FIG. 1A. For the following discussion of the rotary drive apparatus 10, reference will be made to FIGS. 1A, 1B, 1C, 2 and 3.

As best shown in FIGS. 2 and 3, the driving member or drive screw 30 is secured to the link 30 through a bearing 24. The drive screw 30 extends through a pair of rollers, including an upper roller 32 and a lower roller 38. The rollers 32 and 38 are appropriately journaled for rotation in bearings 34 and 40, respectively, to the rotary element 30. The outer periphery of the drive screw or driving member 30 is shown smooth. However, it will be understood that the outer periphery may include helical threads, if desired.

The drum 50, the driven member in the rotary apparatus 10, includes a top 52 and a bottom 64. The top 52 and the bottom 64 are upper and lower surfaces, or top and bottom surfaces, of the driven member 50. As best shown in FIG. 2, the drum 50 is generally divided into three portions, an upper portion 54, a center portion 58, and a lower portion 62. A step 56 generally separates the upper portion 54 from the center portion 58. A step 60 separates the bottom portion 62 from the center portion 58. The diameter of the upper portion 54 and the lower portion 62 is generally less than the diameter of the center portion 58. As shown in FIGS. 2 and 3, the rollers 32 and 38 bear against the upper and lower portions 54 and 62, respectively, for maintaining the distance between the drum 50 and the drive member 30 generally constant throughout the relative rotation of both members.

The upper roller 32 includes an outer peripheral surface 36 which bears against the outer periphery of the upper portion 54. The lower roller 38 includes an outer periphery 42 which bears against the periphery of the lower portion 62. The center portion 58 of the drum accordingly maintains a predetermined, fixed distance from the drive member 30 during the relative rotation of the members 30 and 50.

Also shown in FIGS. 2 and 3 are the two cables 80 and 90 which are coupled to the drive member 30 and to the driven member 50. In FIG. 1A, the upper cable 80 is shown as including a fixed termination 82 at one end within a slot 70 in the member 50. The cable 80 extends about the periphery of the center portion 58 of the member 50 and includes a single loop 86 about the drive member 30 and the cable 80 then returns to the periphery of the center portion 58 and is terminated through a spring 84 and a slot 72 in the member 50. The lower cable 90 is substantially identical to the upper cable 80 in that it includes one end terminated in a fixed manner to the member 50, it then includes a single loop or coil about the drive member 30, and then is terminated through a spring in the member 50. Preferably, the opposite ends of the cables 80 and 90 will be terminated in a fixed manner and through a tension spring. That is, the end of the cable 90, not shown, which is generally parallel to the end 82 of the cable 80 will be terminated through a spring, and the end of the cable 90, not shown, which is parallel to the spring termination end of the cable 84 will be hard terminated. The tension cables at the ends of the cables 80 and 90 provide substantially constant tension for the cables.

As best shown in FIG. 2, and as also shown in FIG. 3, the cables 80 and 90 are wound helically about the drum 50 and about the drive screw 30. The pitch of the cables is substantially the same on both the drum 50 and the drive screw or drive member 30. This allows the cables to maintain substantially constant orientation as the members 30 and 50 rotate.

Returning again to FIGS. 1A, 1B, and 1C, the relative rotation of the members is illustrated. With the axis of rotation of the driven member or drum 50 being through the axle or pin 50, which is disposed within a bearing 68, the rotary motion of the drive member 50 will be non-linear, or varying in response to the distance of the axle or pin 66 from the drive member 30. A shaft secured to the drum 50 for rotation will accordingly vary in its angular speed as the drum 50 rotates.

Since the center of rotation of the drum 50 is not in its geometrical center, the link 20 pivots on its fixed post 22 to compensate for the non-linear movement of the drum 50 as the drum 50 rotates in response to the rotation of the driving element 30.

In FIG. 3, a motor 44 is schematically illustrated as coupled to the drive member 30 for causing the drive element 30 to rotate.

Figure 5:
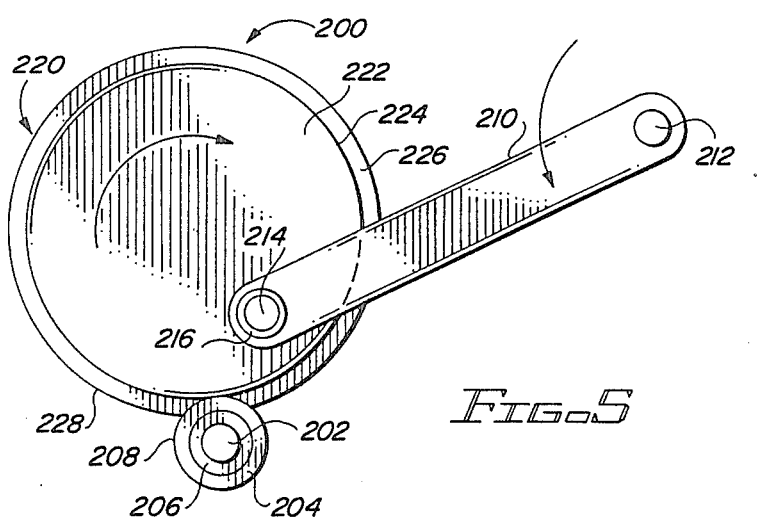
FIG. 5 is a top view of the apparatus of FIG. 4 illustrating the rotation of the apparatus from the position shown in FIG. 4.

In the embodiment of the apparatus 10, the shaft or axle 66 on which the drum 50 rotates is fixed, and the member or drum 50 rotates about the fixed shaft 66. Since the shaft 66 is offset from the geometric center of the member 50, the link 20 pivots to compensate for the non-linear movement of the center portion 58 as the drum 50 rotates. FIGS. 4 and 5 illustrate an embodiment in which a drive member 202 is fixed, and a driven member or drum 220 is secured to a link 210 to allow the driven member 220 to move.

FIG. 4 is a top view of non-linear rotary apparatus 200 which includes a drive shaft or screw 202, the driving member, coupled to a drum 220. The drum 220 is secured at its center of rotation, which is offset from its geometric center. The drum 220 rotates on an axle or pin or shaft 214 which is journaled for rotation on a bearing 216 in the link 210. The link 210 pivots on a fixed pin 212 as the drum 220 rotates.

The drive shaft or screw 202 is substantially identical to the drive shaft or screw 30 of the rotary drive apparatus 10. It includes a pair of rollers, which an upper roller 204 is shown. The upper roller 204 includes a bearing 206. The roller 204 includes an outer periphery 208 which bears against the periphery of an upper portion 224 of the drum 220. The drum 220 includes a step 226 which separates the upper portion 224 from the center portion 228. The center portion 228 is coupled by means of cables, not shown, to the drive screw or drive shaft 202. Essentially, the drive member 202 and the driven member 220 are substantially identical to the drive member 30 and the driven member 50 of the rotary drive apparatus 10 discussed above in physical configuration. The difference is, of course, that the drive member 202 is fixed in rotary drive apparatus 200, while the drive member 30 of rotary drive apparatus 10 pivot on the link 20. The driven member or drum 220 of the rotary drive apparatus 220 pivots on the link 210.

The relative movement or rotation of the drive member 202 and the driven member 220 is shown in FIGS. 4 and 5. In FIG. 4, the link 210 is shown coupled to the shaft 214, with the shaft 214 located in its uppermost position with respect to the drum 220. In FIG. 5 the driven member 220 has rotated so that the center of rotation of the drum 220 is nearly at its lowermost position. It will be noted, of course, that the geometric center of the driven member 220 moves as the drum 220 rotates. The link 220 describes an arc as the drum 220 rotates. The rotation of the driven member 220 varies, just as the rotation of the driven member 50 of the rotary drive apparatus 10 varies. The difference between rotary drive apparatus 10 and rotary drive 200 is, of course, that the shaft 66 for the drum 50 is fixed, and thus the drive member 30 rotates for the rotary drive apparatus 10, and the driving member 202 is fixed for the rotary drive apparatus 200, and the driven member 220 pivots on the link 210.

It will be noted that, under the constraints of the cables 80 and 90, the drum or driven member 50 of the rotary drive apparatus 10 will rotate less than a full three-hundred-sixty degrees. If the same type of cable system is used for the rotary drive apparatus 200, the drum 220 will also rotate less than three-hundred-sixty degrees. Obviously, the extent of the rotation of the driven members will vary in accordance with the cable system coupling the driven member and the driving member together.

In the rotary drive apparatus 10 and 200, the relatively small diameter shafts 30 and 202 have been referred to as the driving member, while the relatively larger diameter drums 50 and 220 have been referred to as the driven members. It is obvious that the relatively larger diameter members may be the driving members, and the relatively smaller diameter members may be the driven members, if desired. Moreover, as indicated above, the peripheries of the driven and driving members may be helically threaded to provide a specific path for the coupling cables. Also, it will be understood that in some cases the rollers may not be need to provide relatively constant spacing between the driving member and the driven member. The cable system coupling the two members together will be sufficient to insure substantially constant spacing of the two members.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Non-linear rotary drive apparatus, comprising, in combination:
   first rotatable member means having a geometric center and an axis of rotation spaced apart from its geometric center for providing non linear rotational speed as the member means is rotated;
   second rotatable member means disposed adjacent to the first rotatable member means;
   cable means coupling the first and second rotatable member means together for joint rotary movement; and
   pivoting link means for compensating for the difference between the geometric center and the axis of rotation of the first rotatable member means connected to the second rotatable member means for pivoting the second rotatable member means to maintain the second rotatable member means adjacent to the first rotatable member means as the first rotatable member means rotates on its axis of rotation.

2. The apparatus of claim 1 in which the second rotatable member means includes a rotatable shaft and roller means journaled for rotation on the shaft and disposed against the first rotatable member means for maintaining a predetermined distance between the first rotatable member means and the shaft.

3. The apparatus of claim 2 in which the first rotatable member means includes a top portion, a center portion, and a lower portion, and the roller means is disposed against the top and lower portions.

4. The apparatus of claim 3 in which the roller means includes a first roller disposed against the top portion and a second roller disposed against the lower portion.

5. The apparatus of claim 1 in which the pivoting link means includes a fixed end and a free end, and the second rotatable member means is secured to the free end.

6. Non-linear rotary drive apparatus, comprising, in combination:
   first rotatable member means having a geometric center and an axis of rotation spaced apart from its geometric center for providing non linear rotational speed as the member means is rotated;
   second rotatable member means disposed adjacent to the first rotatable member means;
   cable means coupling the first and second rotatable member means together for joint rotary movement; and
   pivoting link means, for compensating for the difference between the geometric center and the axis of rotation of the first rotatable member means, connected to the first rotatable member means for pivoting the first rotatable member means to maintain the first rotatable member means adjacent to the second rotatable member means as the first rotatable member means rotates on its axis of rotation.

7. The apparatus of claim 6 in which the second rotatable member means includes a rotatable shaft and a roller journaled for rotation on the shaft and disposed against the first rotatable member means for maintaining a predetermined distance between the first rotatable member means and the shaft.

8. The apparatus of claim 6 in which the pivoting link means includes a fixed end and a free end, and the first rotatable member means is secured to the free end.

* * * * *